(No Model.)
L. KRUCKEMEYER.
APPARATUS FOR TREATING LEAF TOBACCO.
No. 257,724. Patented May 9, 1882.
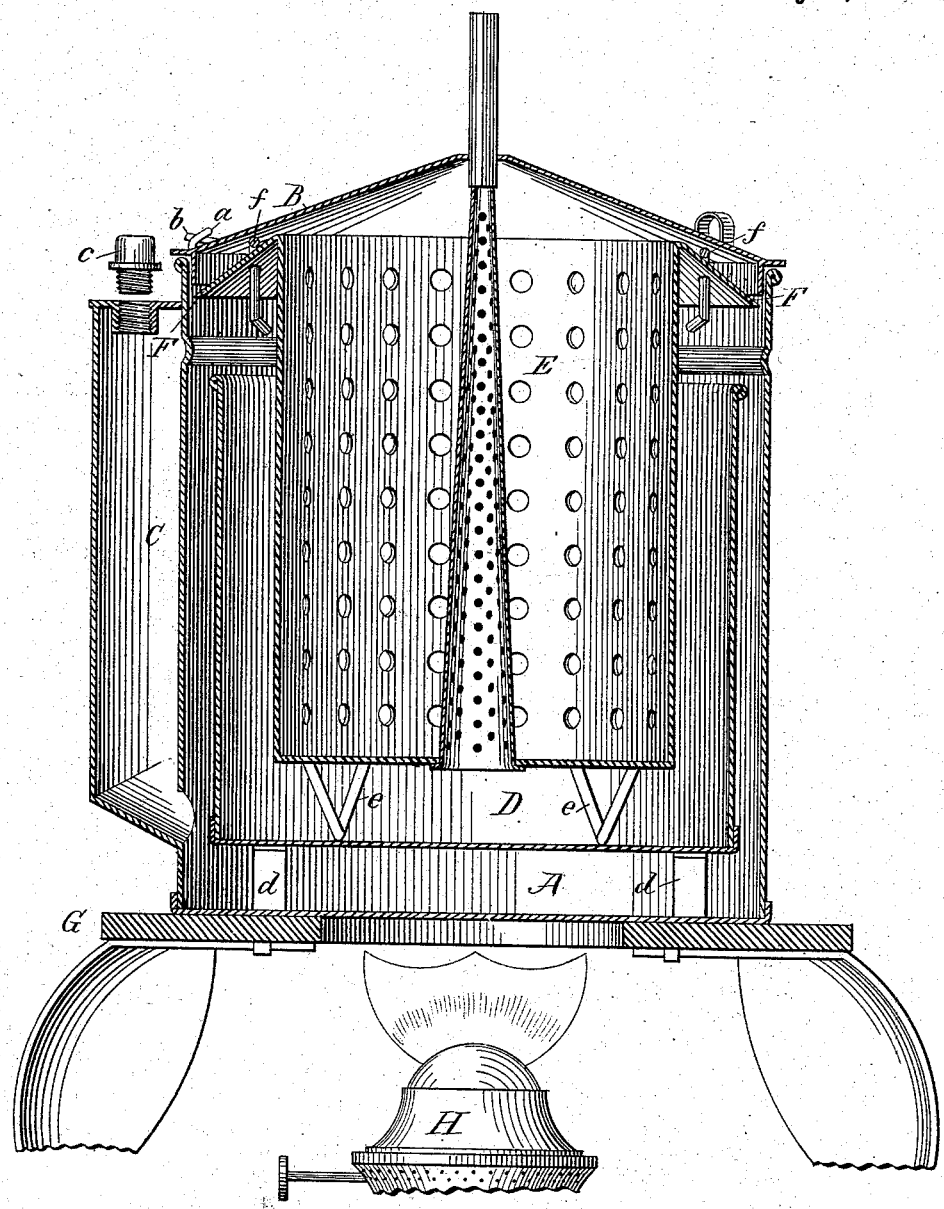
Witnesses
Horatio V Croll
Christian D. Rapp
Inventor
Louis Kruckemeyer
By Geo. J. Murray
Atty

UNITED STATES PATENT OFFICE.

LOUIS KRUCKEMEYER, OF CINCINNATI, OHIO.

APPARATUS FOR TREATING LEAF-TOBACCO.

SPECIFICATION forming part of Letters Patent No. 257,724, dated May 9, 1882.

Application filed December 27, 1881. (No model.)

*To all whom it may concern:*

Be it known that I, LOUIS KRUCKEMEYER, of the city of Cincinnati, county of Hamilton, State of Ohio, have invented certain new and useful Improvements in Apparatus for Treating Leaf-Tobacco, of which the following is a specification.

The object of my invention is an apparatus for the use of cigar-makers, by means of which they may resweat and color their leaf-tobacco as it is required without requiring much of their time and attention, and without risk of burning or injuring the tobacco.

The accompanying drawing is a central vertical sectional view of my improved apparatus.

Referring to the parts, A is a sheet-metal vessel, having a close-fitting cover, B, locked in position by pins $b$ upon the cover, which are turned under hooks $a$, secured upon the side of the vessel and projecting up above its edge.

To the side of vessel A is secured a tube, C, which opens into the vessel A near the bottom. The upper end of the tube is provided with a screw-plug, $c$. This tube is for supplying the vessel with water.

Within vessel A is a plain cylindrical vessel, D. This vessel rests upon brackets $d$, which are secured to the bottom and sides of vessel A, so that there is a space left between the two vessels.

E is a perforated vessel, resting upon feet $e$ within the vessel D. It has a central perforated tube extending from the bottom up through the cover B. Around the upper edge of vessel E is secured an inclined flange, F, the outer edge of which rests loosely against the inside of vessel A.

$f$ are handles to lift out and replace the vessel E.

The apparatus rests upon a stand or spider, G, which has a central opening to expose the bottom of the vessel A to the flame of a lamp, H.

The tobacco-leaf, after being cased in the usual manner, is placed within the perforated vessel E, the cover B placed and locked in position. The lower part of vessel A, below the bottom of vessel D, being supplied with water, heat is applied to the bottom of vessel A. The steam passing up between the vessels A and D is deflected by flange F around the perforated leaf-holder E, and, passing up through its central perforated open-bottomed tube, reaches all of the loosely-packed leaf. The vapor which is condensed against the cover B is carried down upon the flange F, and thence returned to the bottom of vessel A. The length of time required to resweat and bring the leaf to the desired color will depend much on the kind of tobacco—usually from six to twelve hours; but this can be readily determined by occasionally removing the cover and inspecting the contents of vessel E.

It is found that cigars made from tobacco just resweated are much better than when the tobacco is permitted to dry and afterward recased or dampened before use, and the tobacco is much tougher and more easily worked. My apparatus being cheap and easily handled by any one, the manufacturers of cigars can readily resweat their own tobacco when desired for use instead of, as now, buying the resweated article by the case.

My apparatus will operate well with the cover entirely closed in the center and the perforated tube made to terminate just above vessel E; and, indeed, the central tube in the perforated vessel may be omitted entirely, as the perforations in the shell and bottom of the vessel will provide ample circulation for the steam, except perhaps in large vessels.

What I claim as new, and desire to secure by Letters Patent, is—

The combination of the vessel A, having cone-shaped locked cover B, with the perforated vessel E, having inclined flange F, and the intervening vessel D, said vessels being constructed and located with relation to each other as shown and described.

LOUIS KRUCKEMEYER.

Witnesses:
D. S. OLIVER,
GEO. J. MURRAY.